United States Patent
Eberhardt et al.

(10) Patent No.: US 9,808,785 B2
(45) Date of Patent: Nov. 7, 2017

(54) HIGH COHESIVE STRENGTH COMPOSITE MATERIALS AND, E.G., CIGARETTE FILTERS SHAPED THEREFROM

(75) Inventors: Robert Eberhardt, Malterdingen (DE); Eric Perin, Taverny (FR)

(73) Assignee: Rhodia Operations, Aubervilliers (FR)

( * ) Notice: Subject to any disclaimer, the term of this patent is extended or adjusted under 35 U.S.C. 154(b) by 1174 days.

(21) Appl. No.: 12/441,010

(22) PCT Filed: Sep. 11, 2007

(86) PCT No.: PCT/EP2007/059515
§ 371 (c)(1),
(2), (4) Date: Nov. 13, 2009

(87) PCT Pub. No.: WO2008/031816
PCT Pub. Date: Mar. 20, 2008

(65) Prior Publication Data
US 2010/0043813 A1 Feb. 25, 2010

(30) Foreign Application Priority Data

Sep. 13, 2006 (FR) ..................... 06 08000

(51) Int. Cl.
| | | |
|---|---|---|
| *B01J 20/28* | (2006.01) | |
| *A24D 3/16* | (2006.01) | |
| *B01J 20/06* | (2006.01) | |
| *B01J 20/08* | (2006.01) | |
| *B01J 20/10* | (2006.01) | |
| *B01J 20/16* | (2006.01) | |
| *B01J 20/20* | (2006.01) | |

(52) U.S. Cl.
CPC ........ *B01J 20/28078* (2013.01); *A24D 3/163* (2013.01); *A24D 3/166* (2013.01); *B01J 20/06* (2013.01); *B01J 20/08* (2013.01); *B01J 20/103* (2013.01); *B01J 20/16* (2013.01); *B01J 20/20* (2013.01); *B01J 20/2803* (2013.01); *B01J 20/28004* (2013.01); *B01J 20/2808* (2013.01); *B01J 20/28019* (2013.01); *B01J 20/28026* (2013.01); *B01J 20/28057* (2013.01); *B01J 20/28069* (2013.01); *B01J 20/28083* (2013.01)

(58) Field of Classification Search
None
See application file for complete search history.

(56) References Cited

U.S. PATENT DOCUMENTS

| | | | |
|---|---|---|---|
| 4,081,402 A | | 3/1978 | Levy et al. |
| 4,548,646 A | * | 10/1985 | Mosser et al. ............ 106/14.12 |
| 4,637,990 A | * | 1/1987 | Torobin ........................ 502/10 |
| 2005/0047985 A1 | * | 3/2005 | Mori et al. .................... 423/335 |

FOREIGN PATENT DOCUMENTS

| | | |
|---|---|---|
| FR | 2239282 | 2/1975 |
| GB | 1045694 | 10/1966 |
| GB | 1313259 | 4/1973 |
| JP | 5-339410 | 12/1993 |

* cited by examiner

Primary Examiner — Michael J Felton

(57) ABSTRACT

Composite materials having high cohesive strength, formed from at least one polymer and from at least one compound selected from among mineral oxides, aluminosilicates and active carbon, are characterized by a mean particle size of at least 100 mm, a pore volume (Vd1) formed by pores having a diameter ranging from 3.6 to 1,000 nm, equal to at least 0.2 $cm^3/g$, a cohesive strength such that its content of particles having a size of less than 100 mm, obtained after being subjected to an air pressure of 2 bar, of less than 1.5%, preferably 0.0%, by volume; such composite materials are formed into useful liquid supports, catalyst supports, additives, or liquid or gas filters, in particular into cigarette filters.

34 Claims, No Drawings

HIGH COHESIVE STRENGTH COMPOSITE MATERIALS AND, E.G., CIGARETTE FILTERS SHAPED THEREFROM

CROSS-REFERENCE TO PRIORITY/PCT APPLICATIONS

This application is a National Stage of PCT/EP 2007/059515, filed Sep. 11, 2007 and designating the United States (published in the French language on Mar. 20, 2008, as WO 2008/031816 A2; the title and abstract were also published in English), which claims priority of FR 06/08000, filed Sep. 13, 2006, each hereby expressly incorporated by reference in its entirety and each assigned to the assignee hereof.

The present invention relates to highly cohesive materials and to a method for preparing highly cohesive materials.

It also relates to their uses, in particular as a liquid support, a catalyst support, an additive or for liquid or gas filtration; it relates more particularly to their use in cigarette filters.

It is known to condition liquids on solid supports, in particular on a silica support.

It is also known to use a compound such as activated carbon for its adsorption properties, especially for liquid or gas filtration, in particular in cigarette filters.

One of the aims of the invention is to supply a new material having a high cohesion and which preferably produces little or no dust, which may possibly be used satisfactorily as a liquid support or for gas or liquid filtration, in particular in cigarette filters, especially as an active filter, preferably by substitution of the activated carbon and/or in addition to the conventionally used filter, such as cellulose acetate.

Thus, one subject of the invention is a composite material, characterized in that it is formed from at least one polymer (P) and from at least one compound (C) chosen from mineral oxides, silicoaluminates and activated carbon, and in that it has:
- a median particle size of at least 100 µm, and preferably of at most 2000 µm;
- a pore volume (Vd1), made up of pores of diameter between 3.6 and 1000 nm, of at least 0.2 cm$^3$/g; and
- a cohesion such that its amount of particles with a size of less than 100 µm, obtained after an air pressure stress of 2 bar, following the test described below, is less than 1.5% by volume.

The polymer (P) is advantageously a porous polymer.

The polymer (P) is in general chosen from the following polymers: cellulose and its derivatives (in particular cellulose acetate), starch and its derivatives, alginates and their derivatives, polyethylene, guars and their derivatives, polyvinyl alcohols and their derivatives.

The polymer (P) may be, for example, one of the polymers below: cellulose, cellulose acetate, cellulose sulphate, ethyl cellulose, hydroxyethyl cellulose, methyl cellulose, hydroxymethyl cellulose, carboxymethyl cellulose, starch, carboxymethylated starch, hydroxypropyl starch, gum arabic, agar, alginic acid, sodium alginate, potassium alginate, calcium alginate, gum tragacanth, guar gum, carob bean gum, polyvinyl acetates (possibly hydrolysed), copolymers of polyvinyl acetates and vinyl esters of aliphatic carboxylic acids, polyvinyl alcohols, polyethylene, copolymers of ethylene and vinyl esters of saturated aliphatic carboxylic acids and hydrated polycyclopentadiene.

In particular, the polymer (P) may be cellulose or one of its derivatives (amongst others, cellulose acetate or cellulose sulphate), polyethylene, gum arabic or a polyvinyl alcohol.

More particularly, the polymer (P) may be a derivative of cellulose (for example, cellulose acetate, cellulose sulphate, ethyl cellulose, hydroxyethyl cellulose, methyl cellulose, hydroxymethyl cellulose or carboxymethyl cellulose).

Most preferably, the polymer (P) is cellulose acetate.

The compound (C) is most often an adsorbent and/or a catalyst support.

The compound (C) may be a mineral oxide, such as, in particular, a silica, an alumina, a zirconium oxide, a titanium oxide, an iron oxide or a cerium oxide.

The compound (C) may also be an aluminosilicate.

Finally, the compound (C) may be activated carbon (in particular, coconut activated carbon).

Thus, the compound (C) is generally chosen from silicas, aluminas, zirconium oxides, titanium oxides, iron oxides, cerium oxides, aluminosilicates and activated carbon.

The compound (C) consists, for example, of a synthetic amorphous silica.

This may be a fumed silica, a colloidal silica, a silica gel, a precipitated silica or one of their mixtures.

According to one preferred variant of the invention, the compound (C) is precipitated silica.

According to another preferred variant of the invention, the compound (C) is activated carbon.

The composite material may contain, according to one embodiment of the invention, a mixture of compounds (C), in particular a mixture of precipitated silica and activated carbon.

The composite material conforming to the invention may be made solely of at least one polymer (P) and at least one compound (C).

The median particle size (D50$_{initial}$) is measured by laser scattering, for example according to the standard NF X 11-666, using a MALVERN MASTERSIZER 2000 particle size analyser (from Malvern Instruments), in the absence of ultrasounds and of dispersant, the measurement liquid being degassed demineralised water (2 g of sample being dispersed in 50 ml of water with magnetic stirring) and the measurement time being 5 seconds. The value retained is the average of three measurements carried out consecutively on the same sample.

The cohesion is measured by the following cohesion test.

A MALVERN MASTERSIZER 2000 laser particle size analyser (from Malvern Instruments) is used coupled to the Scirocco dry mode sampling unit. The analysis is carried out using the Fraunhofer optical model, with a measurement time of 5 seconds.

A first analysis may be carried out by introducing the product solely by the vibration of the hopper and aspiration, in order to have access to an initial size of the product.

A second analysis is carried out by injecting, via the nozzle of the sampling unit, an air pressure of 2 bar. This pressure value has been defined for granules made up solely of activated carbon, the activated carbon being a product already used in cigarette filters; it generates a sufficient stress to start the attrition of the activated carbon. This stress level thus corresponds to the appearance of fine particles (particles with a size of less than 100 µm) in the case of activated carbon alone; it is used as a reference value for positioning the composite materials according to the invention.

The amount of possible fine particles generated by this stress makes it possible to evaluate the cohesion (hardness) of a product. The following measurements carried out on activated carbon alone make up the reference values with respect to which the composite materials according to the invention may be evaluated (% by volume):

at 2 bar:
amount of particles with a size of less than 100 μm=2.0%; and
amount of particles with a size of less than 20 μm=0.0%;
for information, at 0 bar (that is to say without any air pressure):
amount of particles with a size of less than 100 μm=0.0%; and
amount of particles with a size of less than 20 μm=0.0%.

It should be noted that the detection of fine particles (particles with a size of less than 100 μm) without any air pressure would reveal the presence of a particularly brittle product.

The cohesion of the composite materials according to the invention expresses, in particular, their ability to resist a level of stress without forming, in a significant amount, and advantageously without forming at all, fine particles which, in particular, may possibly be inhaled by the smoker when these materials are used in cigarette filters.

The pore volumes and diameters of the pores are measured by mercury porosimetry (Micromeritics Autopore 9520 porosimeter, for example); for these measurements, the preparation of each sample may be carried out as follows: each sample is first dried for 2 hours at 90° C., under atmospheric pressure, then placed in a test vessel in the 5 minutes following this drying and degassed under vacuum, for example using a vacuum pump; the sample sizes are 0.22 g (±0.01 g); the no. 10 penetrometers are used. The pore diameters are calculated by Washburn's equation with a contact angle θ=140° and a surface tension γ equal to 484 dynes/cm. In the present text, pores having a diameter between 3.6 and 1000 nm are not taken into account.

The composite material according to the invention has a median particle size of at least 100 μm, especially at least 200 μm. Preferably, this is at most 2000 μm. It may be between 100 and 1000 μm, in particular between 200 and 1000 μm, for example between 200 and 900 μm.

In general, it has a median particle size greater than 250 μm (especially varying from 250 (exclusive) to 2000 μm, even to 1000 μm), preferably at least 300 μm, especially between 300 and 2000 μm, in particular between 300 and 1000 μm.

Its median particle size is in general between 400 and 1000 μm, in particular between 500 and 1000 μm, especially between 600 and 1000 μm, for example between 600 and 900 μm.

The composite material conforming to the invention may have, for example when it is intended to be used in a cigarette filter, particle sizes between 100 and 2000 μm, especially between 200 and 1500 μm, in particular between 200 and 800 μm, even between 400 and 800 μm.

The composite material according to the invention is, advantageously, porous.

It has an intra-particle pore volume (Vd1), made up of pores of diameter between 3.6 and 1000 nm (that is to say a pore volume accumulated from pores of diameter between 3.6 and 1000 nm), of at least 0.2 cm$^3$/g, and usually at most 3.0 cm$^3$/g (cm$^3$ per gram of composite material).

Its pore volume (Vd1) is, in general, at least 0.3 cm$^3$/g (for example between 0.3 and 3.0 cm$^3$/g), preferably (especially in the case where the compound (C) is activated carbon) at least 0.4 cm$^3$/g, in particular between 0.4 and 3.0 cm$^3$/g, for example between 0.4 and 2.0 cm$^3$/g, even between 0.45 and 1.5 cm$^3$/g. Especially in the case where the compound (C) is silica (preferably precipitated silica), the pore volume (Vd1) of the composite material according to the invention may be at least 0.5 cm$^3$/g, in particular between 0.5 and 3.0 cm$^3$/g, for example between 0.5 and 2.0 cm$^3$/g, even between 0.55 and 1.5 cm$^3$/g. Still more preferably, its pore volume (Vd1) is at least 0.7 cm$^3$/g, in particular between 0.7 and 3.0 cm$^3$/g, especially between 0.7 and 2.0 cm$^3$/g, for example between 0.75 and 1.5 cm$^3$/g.

The composite material according to the invention has a high cohesive strength.

It has a cohesion such that its amount of particles with a size of less than 100 μm, obtained after an air pressure stress of 2 bar, following the cohesion test described above, is less than 1.5%, preferably less than 0.5%, by volume.

Its amount of particles with a size of less than 20 μm, obtained after an air pressure stress of 2 bar, following the cohesion test described above, is generally equal to 0.0% by volume.

Its amount of particles with a size of less than 20 μm and its amount of particles with a size of less than 100 μm, obtained without an air pressure stress, following the cohesion test described above, are generally equal to 0.0% by volume.

Advantageously, more particularly when it is intended to be used in a cigarette filter, and for example, amongst others, when the compound (C) is silica (preferably precipitated silica) and/or activated carbon, its cohesion is such that its amount of particles with a size of less than 100 μm, obtained after an air pressure stress of 2 bar, following the cohesion test described above, is equal to 0.0% by volume.

The composite material conforming to the invention preferentially does not generate dust during its handling.

The composite material according to the present invention has, preferably, especially when it is used in a cigarette filter, a filterability close to, even greater than, that of the compound (C) incorporated in its composition, in particular when the compound (C) is activated carbon and/or silica (preferably precipitated silica), while having a better cohesion. This is even more the case when the polymer (P) is cellulose acetate.

The composite material conforming to the invention may have, especially when the compound (C) is silica, in particular precipitated silica, an average pore diameter, for the pores of diameter between 3.6 and 1000 nm, greater than 11 nm (for example, between 11 (exclusive) and 100 nm or between 11 (exclusive) and 50 nm), preferably at least 11.5 nm, for example between 11.5 and 100 nm; it may be between 11.5 and 50 nm, in particular between 11.5 and 40 nm, especially between 12 and 40 nm, for example between 12 and 25 nm or between 12 and 17 nm; it may also vary between 13 and 40 nm, in particular between 13 and 25 nm, for example between 13.5 and 25 nm, even between 13.5 and 17 nm.

The composite material according to the invention, which is advantageously in solid form, generally has a BET specific surface area of at least 50 m$^2$/g. In general, its BET specific surface area is at most 1300 m$^2$/g and in particular at most 1200 m$^2$/g, especially at most 1000 m$^2$/g, for example at most 900 m$^2$/g, even at most 700 m$^2$/g (m$^2$ per gram of composite material).

The BET specific surface area is determined according to the Brunauer-Emmett-Teller method described in "The Journal of the American Chemical Society", vol. 60, page 309, February 1938 and corresponding to the standard NF ISO 9277 (December 1996).

The BET specific surface area of the composite material according to the present invention may be at least 100 m$^2$/g, in general at least 160 m$^2$/g, preferably at least 200 m$^2$/g (for example greater than 300 m$^2$/g); it may be between 250 and 1300 m$^2$/g, in particular between 280 and 1200 m$^2$/g, for example between 280 and 800 m$^2$/g. It may also be between 320 and 1000 m$^2$/g, in particular between 320 and 900 m$^2$/g, especially between 320 and 700 m$^2$/g, even between 320 and 600 m$^2$/g. For example, in the case where the compound (C) is silica, in particular precipitated silica, the BET specific surface area of the composite material according to the invention may be between 250 and 800 m$^2$/g, especially between 250 and 600 m$^2$/g; for example, in the case where the compound (C) is activated carbon, it may be between 400 and 1300 m$^2$/g, especially between 400 and 1000 m$^2$/g.

The specific surface area of the composite material conforming to the invention is essentially a function of the specific surface area of the compound (C), its compound (C) content and the surface accessibility of the compound (C) within the composite material, which gives porosity to the polymer (P). Preferably, the composite material according to the invention retains a large part (for example at least 60%) of the specific surface area of the compound (C), in particular when the polymer (P) is cellulose acetate, especially in the case where the compound (C) is activated carbon and/or especially silica (preferably precipitated silica).

According to one particular embodiment, more particularly when it is intended to be used in a cigarette filter, and for example, amongst others, when the compound (C) is silica (preferably precipitated silica) and/or activated carbon, the composite material conforming to the invention has a median particle size of at least 300 µm (and for example at most 2000 µm), especially between 400 and 1000 µm, for example between 500 and 1000 µm, a BET specific surface area greater than 300 m$^2$/g (and for example at most 1200 m$^2$/g), in particular between 320 and 900 m$^2$/g, especially between 320 and 700 m$^2$/g, for example between 320 and 500 m$^2$/g, even between 340 and 430 m$^2$/g, and a cohesion such that its amount of particles with a size of less than 100 µm, obtained after an air pressure stress of 2 bar, following the test described above, is equal to 0.0% by volume. In this embodiment, the polymer (P) is, preferably, cellulose acetate.

In general, the composite material according to the invention has a polymer (P) content between 10 and 95%, preferably between 15 and 45%, by weight, and a compound (C) content between 5 and 90%, preferably between 55 and 85%, by weight.

The composite material according to the present invention may especially be in the form of extrudates, for example in cylindrical form, or preferentially in the form of granules, especially approximately spheroidal granules.

It may contain, in addition to the polymer (P) and the compound (C), at least one aroma and/or at least one plasticizer.

Another subject of the invention is a method for preparing a composite material, in particular the composite material according to the invention, described in the preceding text, comprising the following successive steps:

1) adding at least one compound (C), chosen from mineral oxides, aluminosilicates and activated carbon, into at least one polymer (P) solution, preferably with stirring;
2) forming of the mixture obtained, preferably by granulation or by extrusion;
3) introducing, into a liquid that is not a solvent for the polymer (P) and that is at least partially miscible with the solvent used in the polymer (P) solution, the product formed, in order to make said polymer (P) insoluble;
4) washing the product obtained (possibly more than once) in order to eliminate, at least partially, the solvent used in the polymer (P) solution; and
5) drying.

The polymer (P) used is, advantageously, a porous polymer.

The polymer (P) is in general chosen from the following polymers: cellulose and its derivatives (in particular cellulose acetate), starch and its derivatives, alginates and their derivatives, polyethylene, guars and their derivatives, polyvinyl alcohols and their derivatives.

The polymer (P) may be, for example, one of the polymers below: cellulose, cellulose acetate, cellulose sulphate, ethyl cellulose, hydroxyethyl cellulose, methyl cellulose, hydroxymethyl cellulose, carboxymethyl cellulose, starch, carboxymethylated starch, hydroxypropyl starch, gum arabic, agar, alginic acid, sodium alginate, potassium alginate, calcium alginate, gum tragacanth, guar gum, carob bean gum, polyvinyl acetates (possibly hydrolysed), copolymers of polyvinyl acetates and vinyl esters of aliphatic carboxylic acids, polyvinyl alcohols, polyethylene, copolymers of ethylene and vinyl esters of saturated aliphatic carboxylic acids and hydrated polycyclopentadiene.

In particular, the polymer (P) may be cellulose or one of its derivatives (amongst others, cellulose acetate or cellulose sulphate), polyethylene, gum arabic or a polyvinyl alcohol.

More particularly, the polymer (P) may be a derivative of cellulose (for example, cellulose acetate, cellulose sulphate, ethyl cellulose, hydroxyethyl cellulose, methyl cellulose, hydroxymethyl cellulose or carboxymethyl cellulose).

Most preferably, the polymer (P) is cellulose acetate.

The compound (C) used is most often an adsorbent and/or a catalyst support.

The compound (C) may be a mineral oxide, such as, in particular, a silica, an alumina, a zirconium oxide, a titanium oxide, an iron oxide or a cerium oxide.

The compound (C) may also be an aluminosilicate.

Finally, the compound (C) may be activated carbon (in particular, coconut activated carbon).

Thus, the compound (C) is generally chosen from silicas, aluminas, zirconium oxides, titanium oxides, iron oxides, cerium oxides, aluminosilicates and activated carbon.

The compound (C) consists, for example, of a synthetic amorphous silica.

This may be a fumed silica, a colloidal silica, a silica gel, a precipitated silica or one of their mixtures.

According to a preferred variant of the invention, the compound (C) is precipitated silica. This may be prepared by a reaction for precipitating a silicate, such as an alkali metal silicate (sodium silicate for example), with an acidifying agent (sulphuric acid for example) to produce a suspension of precipitated silica, then usually by separating, in particular by filtering (with production of a filter cake) the precipitated silica obtained, and finally drying (generally by spraydrying); any method may be used to prepare the precipitated silica: especially, addition of acidifying agent to a stock of silicate, total or partial simultaneous addition of acidifying agent and silicate to a stock of water and silicate.

According to another preferred variant of the invention, the compound (C) is activated carbon.

According to one embodiment of the invention, a mixture of compounds (C), in particular a mixture of precipitated silica and activated carbon, is used.

The compound (C) used in step 1) of the method according to the invention advantageously has a relatively high specific surface area. It generally has, in particular in the case of a precipitated silica and/or activated carbon, a BET specific surface area of at least 100 m$^2$/g, preferably at least 200 m$^2$/g, in particular greater than 450 m$^2$/g.

The compound (C) usually has a median particle size of at least 0.5 μm, in particular between 0.5 and 100 μm.

When the compound (C) is precipitated silica, this size is preferably more particularly between 0.5 and 50 μm, especially between 0.5 and 20 μm, for example between 2 and 15 μm.

When the compound (C) is activated carbon (in particular coconut activated carbon), this size is preferably more particularly between 1 and 80 μm, especially between 2 and 70 μm.

The compound (C) used in step 1) of the method according to the invention, in particular when it is silica, especially precipitated silica, preferably has a DOP oil uptake of less than 260 ml/100 g, especially less than 240 ml/100 g, for example less than 225 ml/100 g. Its DOP oil uptake may be less than 210 ml/100 g, even 205 ml/100 g. Its DOP oil uptake may be at least 80 ml/100 g, especially greater than 145 ml/100 g, for example greater than 180 ml/100 g. The DOP oil uptake is determined according to the standard ISO 787/5 using dioctyl phthalate (the measurement is carried out on the compound (C) as is).

The compound (C) used, in particular when it is silica, especially precipitated silica, and/or activated carbon, generally has a CTAB specific surface area (outer surface area determined according to the standard NF T 45007 (November 1987)) greater than 280 m$^2$/g, especially greater than 300 m$^2$/g, in particular greater than 330 m$^2$/g, for example greater than 350 m$^2$/g; it may be less than 450 m$^2$/g.

In step 1) of the method according to the present invention, a particular precipitated silica may especially be used having:
- a DOP oil uptake of less than 260 ml/100, especially less than 240 ml/100 g, in particular less than 225 ml/100 g;
- a pore volume ($V_{d25}$), formed from pores of diameter less than 25 nm, greater than 0.8 ml/g, especially greater than 0.9 ml/g, for example at least 0.95 ml/g (pore volume determined by the method of Barett, Joyner and Halenda, known as the BJH method, described especially, by F. Rouquerol, L. Luciani, P. Llewwellyn, R. Denoyel and J. Rouquerol, in "Les Techniques de l'Ingenieur", September 2001);
- a CTAB specific surface area greater than 280 m$^2$/g, especially greater than 300 m$^2$/g, in particular greater than 330 m$^2$/g, for example greater than 350 m$^2$/g; and preferably, a BET specific surface area greater than 450 m$^2$/g, for example greater than 510 m$^2$/g.

This particular precipitated silica may have a pore diameter ($d_p$), for pores of diameter less than 25 nm, taken at the maximum of the pore size distribution by volume, of less than 12.0 nm, in particular less than 8.0 nm (method of Barett, Joyner and Halenda).

It may be prepared by a method comprising the reaction of a silicate with an acidifying agent, from which a suspension of precipitated silica is obtained, then separating and drying (especially by spraydrying) this suspension, the reaction of the silicate with the acidifying agent being carried out according to the following successive steps:
(i) an initial stock is formed comprising one part of the total quantity of silicate involved in the reaction, the concentration of silicate (expressed as SiO$_2$) in said initial stock being between 10 and 50 g/l, preferably between 12 and 48 g/l, in particular between 15 and 45 g/l, and the temperature of said initial stock being between 40 and 65° C.;

(i') optionally, the acidifying agent is added to said stock, over 5 to 30 minutes, until a pH value of the reaction medium of between 3.5 and 8.5 is obtained;

(ii) the acidifying agent and the remaining quantity of silicate are added, preferably simultaneously, to said stock, over 20 to 150 minutes, the quantity of silicate added (expressed as SiO$_2$)/quantity of silicate present in the initial stock (expressed as SiO$_2$) ratio being greater than 5:
a) either at constant flow rates resulting, at the end of this simultaneous addition, in a pH value of the reaction medium of between 3.5 and 8.5;
b) or at an acidifying agent flow rate adjusted so as to maintain the pH of the reaction medium at a constant value and between 3.5 and 8.5;

(iii) the acidifying agent is added to the reaction medium, in the case where the pH value of the reaction medium at the end of step (ii) is greater than 6.0, over 3 to 25 minutes, so as to achieve a pH value of the reaction medium of between 3.5 and 6.0; and (iv) the reaction medium, obtained at the end of the preceding step, is maintained with stirring over 5 to 60 minutes.

The surface of the particles of the compound (C) used, in particular when it is a precipitating silica, may first be functionalized, especially by grafting or absorption of organic molecules, comprising for example at least one amino, phenyl, alkyl, cyano, nitrile, alkoxy, hydroxyl, amide, thio and/or halogen functional group.

In step 1) of the method according to the invention, the compound (C) is mixed with a solution of the polymer (P), preferably with stirring and, in particular, gradually so as to obtain the most homogeneous mixture possible. This step amounts to dispersing the compound (C) (in solid form) in a medium formed by the polymer (P) in solution in one of its solvents. A granulator type mixer may possibly be used here, for example of the Rotolab Zanchetta type.

The following may, for example, be used as solvents: acetic acid (in particular when the polymer (P) is cellulose acetate), water (in particular in the case where the polymer (P) is cellulose sulphate, a polyvinyl alcohol or gum arabic), a naphthenic oil (in particular in the case where the polymer (P) is polyethylene).

When the polymer (P) is cellulose acetate, it is generally dissolved in an acetic acid and water mixture, for example in the following weight proportions:
cellulose acetate: 10 to 25%;
acetic acid: 65 to 80%; and
water: 5 to 15%.

An addition of solvent (for example of acetic acid in the case where the polymer (P) is cellulose acetate) may be made into the mixture formed at the end of step 1), or into the polymer (P) solution, especially to decrease the viscosity thereof.

The proportions of polymer (P) and compound (C) used in step 1) depend on the proportions desired in the final composite material, and are, in general, such that the composite material has a polymer (P) content between 10 and 95%, preferably between 15 and 45%, by weight, and a compound (C) content between 5 and 90%, preferably between 55 and 85%, by weight.

Step 2) for forming the mixture obtained at the end of step 1) may be carried out by compacting (for example using an Alexanderwerk compactor).

Preferably, step 2) is rather carried out by granulation or by extrusion.

The granulation may take place in continuous or batch mode. The product obtained is in the form of granules.

It may be carried out in a mechanical rotary granulator.

A moderate shear rate rotary ploughshare granulator, especially a Lödige granulator, may be used.

The granulation is preferably carried out in a high shear rate granulator.

Preferably, a rotary granulator equipped with blades or pins, in particular a Rotolab Zanchetta granulator, is used, which generally functions in batch mode.

The granulation is usually carried out with stirring.

It may be carried out at room temperature (temperature of the installation location).

In general, 25 to 75% of the volume of the granulator bowl (chamber), in particular in the case of a Rotolab Zanchetta granulator, is initially filled by the mixture obtained at the end of step 1).

The rotor speed of the granulator, in particular in the case of a Rotolab Zanchetta granulator, may be between 200 and 1000 rpm, for example between 400 and 600 rpm.

The extrusion may be a high-pressure extrusion (for example using a ram press type device) or a low-pressure extrusion (for example using a Fuji Paudal type device). The extrudates obtained generally are in cylindrical form.

The method according to the invention may comprise, at the end of step 2), a possible calibration and/or milling step, in order to eliminate the possible products that do not have the desired size. Said method may possibly comprise, in addition, a spheronization step, so as to increase the spheroidal nature of the product.

In step 3) of the method according to the invention, the polymer (P) is made insoluble (precipitated) by introducing, into a liquid that is not a solvent for said polymer (P) and that is at least partly (preferably totally) miscible with the solvent used in the polymer (P) solution used in step 1), the product from the forming step 2). Making the polymer (P) insoluble converts it into a porous solid matrix in which the compound (C) is dispersed.

The following may, for example, be used by way of the liquid that is not a solvent for the polymer (P): water (in particular when the polymer (P) is cellulose acetate and the solvent used is acetic acid), a (dilute) aqueous solution of acetic acid (in particular when the polymer (P) is cellulose acetate and the solvent used is acetic acid), ethanol (in particular in the case where the polymer (P) is cellulose sulphate and the solvent used is water), a carboxylic acid (in particular in the case where the polymer (P) is a polyvinyl alcohol and the solvent used is water), an alcohol (in particular in the case where the polymer (P) is gum arabic and the solvent used is (hot) water)) or hexane (in particular in the case where the polymer (P) is polyethylene and the solvent used is a naphthenic oil).

The liquid that is not a solvent for the polymer (P) is in general heated first. Especially when the polymer (P) is cellulose acetate and said liquid is water, the product from step 2) may thus be introduced into said liquid being at a temperature between 30 and 90° C., in particular between 45 and 75° C., even between 50 and 70° C.; here, for example, about 70 to 130 g of product from step 2) may be introduced per liter of water.

Step 3) is generally carried out with stirring.

Step 4) of the method conforming to the invention consists in washing the product obtained at the end of step 3) one or more times (after having separated it from the liquid used in step 3)), in order to at least partly, preferably totally, remove the residual solvent. This washing may be carried out with water, especially in the case where the solvent used for the polymer (P) is acetic acid.

Then, after a possible step of (preferably light) wiping, the method according to the invention comprises a step 5) of drying, especially in order to remove the washing liquid used in step 4).

Especially when the washing liquid is water, and in particular when the polymer (P) is cellulose acetate, the drying step may be carried out at a temperature between 50 and 120° C., for example in a ventilated device (especially an oven or fluid bed), in general for 2 to 60 hours, in particular between 5 and 30 hours.

The method according to the invention may comprise, after the drying step, a possible milling and/or screening (separating) step, in order to remove the possible products that do not have the desired size, especially according to the targeted applications. The composite material obtained may have, for example when it is intended to be used in a cigarette filter, particle sizes between 100 and 2000 μm, especially between 200 and 1500 μm, in particular between 200 and 800 μm, even between 400 and 800 μm.

The method according to the invention makes it possible, advantageously, to prepare a composite material having a filterability at least as high, in general higher, than that of the compound (C) used, in particular when the compound (C) is activated carbon and/or especially silica (preferably precipitated silica). This may be even more the case when the polymer (P) used is cellulose acetate.

Similarly, in a preferred manner, the method according to the invention makes it possible to obtain a composite material that retains a large part (for example at least 60%) of the specific surface area of the compound (C) used, in particular when the polymer (P) is cellulose acetate, especially in the case where the compound (C) is activated carbon and/or especially silica (preferably precipitated silica).

The composite material according to the invention or (capable of being) obtained by the method of the invention may be used especially as a liquid support.

As the liquid, mention may be made especially of organic liquids such as organic acids, surfactants, organic additives for rubbers/polymers, and pesticides.

The following may be used as the liquid: preservatives (phosphoric acid and propionic acid especially), aromas, colorants, liquid food supplements, especially for animal feed (in particular, vitamins (vitamin E for example) and choline chloride).

The composite material according to the invention or (capable of being) obtained by the method of the invention may be used as a catalyst support.

It may also be used as an additive, in particular for bulk or thin film materials. It may be used as an additive for paper, paint, or for preparing battery separators.

The composite material according to the invention or (capable of being) obtained by the method of the invention may be used for liquid filtration (for example for filtering beer) or for gas filtration, especially in chromatography.

Thus it has a particularly beneficial application in cigarette filters. It may be, for example, introduced into a cavity filter or dispersed within the network of fibres making up one of the segments of the filter. It has, advantageously, a good absorbability for the volatile and semi-volatile components of cigarette smoke. Its filterability is preferably close to, even greater than, that of the compound (C) alone. Its characteristics allow a reasonable increase in the pressure drop across the filter and a lower entrainment of fine particles in the smoke than in the case of traditional additives, such as activated carbon and silica, when the cigarette is smoked.

A final subject of the present invention is a cigarette filter containing at least one composite material according to the invention or (capable of being) obtained by the method of the invention; said composite material may comprise at least two different compounds (C), for example precipitated silica and activated carbon.

Thus, a composite material containing several compounds (C) of different types may advantageously be introduced into the same filter, using conventional technology, as if it were a single additive. The invention may therefore make it possible, in addition, to provide an advantage in terms of cost and variety of filters.

The following examples illustrate the invention without however limiting the scope thereof.

EXAMPLES 1-5

In Examples 1 to 3, as compound (C), a precipitated silica in powder form is used as the starting material, having the following characteristics:

BET specific surface area: 550 m$^2$/g;
oil uptake (DOP): 200 ml/100 g;
median particle size: 23 μm; and
moisture (ISO 787/2 standard, 105° C., 2 h): 7%.

In Example 4, as compound (C), coconut activated carbon in powder form is used as the starting material, sold by Pica (containing 0.5% water, having a median particle size less than 80 μm and a BET specific surface area of 821 m$^2$/g).

In Examples 1 to 4, as polymer (P), cellulose acetate in solution in acetic acid is used as the starting material. More specifically, the solution of cellulose acetate used contains 18% of cellulose acetate, 11% of water and 71% of acetic acid.

Example 1

Firstly, a mixture was prepared by adding 139 g of precipitated silica to 300 g of cellulose acetate solution.

In order to do this, the precipitated silica was added gradually to the cellulose acetate solution, this addition being carried out with stirring (stirrer motor equipped with a frame paddle), so as to obtain a homogeneous mixture.

Next, the mixture obtained was introduced into the bowl of a Rotolab Zanchetta granulator and granulation was carried out under the following conditions:

temperature: room temperature;
rotor speed of the granulator: 500 rpm; and
granulation time: 25 minutes.

The granules obtained at the end of the granulation were then poured into water, preheated to 60° C., in which they were left for 15 minutes, the water being subjected to stirring.

After having removed them from the water, the granules were washed 5 times with cold water (duration of each wash: 15 minutes) in order to remove the residual acetic acid.

After wiping, the granules were dried in a ventilated oven for 12 hours, at a temperature of 95° C.

The characteristics of the composite material thus obtained (reference CM1) are given in Table 1.

Example 2

Firstly, a mixture was prepared by adding 139 g of precipitated silica to 300 g of cellulose acetate solution.

In order to do this, the precipitated silica was added gradually to the cellulose acetate solution, this addition being carried out with stirring (stirrer motor equipped with a frame paddle), so as to obtain a homogeneous mixture; the product obtained was placed in the bowl of a Rotolab Zanchetta granulator, in which it was subjected to stirring (rotor speed: 500 rpm) at room temperature for 5 minutes.

Then the mixture obtained was introduced into the cylindrical screen of a Fuji Paudal extruder, the screen being pierced with 500 μm diameter orifices, and the extrusion was carried out by rotating the rotor that pushes the mixture through the screen, thus generating 500 μm diameter cylindrical extrudates. The application of an airstream made it possible to limit bonding between several cylindrical extrudates.

The extrudates obtained were then poured into water that had been preheated to 60° C., in which they were left for 15 minutes, the water being subjected to stirring.

After having removed them from the water, the extrudates were washed 5 times with cold water (duration of each wash: 15 minutes) in order to remove the residual acetic acid.

After a light wiping, the extrudates were dried in a ventilated oven for 12 hours at a temperature of 95° C.

The characteristics of the composite material thus obtained (reference CM2) are given in Table 1.

Example 3

Firstly, a mixture was prepared by adding 13.9 g of precipitated silica to 30.0 g of cellulose acetate solution.

In order to do this, the precipitated silica was added gradually to the cellulose acetate solution, this addition being carried out with stirring (stirrer motor equipped with a frame paddle), so as to obtain a homogeneous mixture.

Then the mixture obtained was introduced into the ram body of a ram extruder and the extrusion was carried out by passing the mixture through a disc pierced with 800 μm diameter orifices, thus generating 800 μm diameter cylindrical extrudates.

The extrudates obtained were then poured into water that had been preheated to 60° C., in which they were left for 15 minutes, the water being subjected to stirring.

After having removed them from the water, the extrudates were washed 5 times with cold water (duration of each wash: 15 minutes) in order to remove the residual acetic acid.

After a light wiping, the extrudates were dried in a ventilated oven for 12 hours at a temperature of 95° C.

The characteristics of the composite material thus obtained (reference CM3) are given in Table 1.

Example 4

Firstly, a mixture was prepared by adding 109.7 g of activated carbon to 200 g of cellulose acetate solution.

In order to do this, the activated carbon was added gradually to the cellulose acetate solution, this addition being carried out with stirring (stirrer motor equipped with a frame paddle), so as to obtain a homogeneous mixture.

Then the mixture obtained was introduced into the ram body of a ram extruder and the extrusion was carried out by passing the mixture through a disc pierced with 1000 μm diameter orifices, thus generating 1000 μm diameter cylindrical extrudates.

The extrudates obtained were then poured into water that had been preheated to 60° C., in which they were left for 15 minutes, the water being subjected to stirring.

After having removed them from the water, the extrudates were washed 5 times with cold water (duration of each wash: 15 minutes) in order to remove the residual acetic acid.

After a light wiping, the extrudates were dried in a ventilated oven for 12 hours at a temperature of 95° C.

The characteristics of the composite material thus obtained (reference CM4) are given in Table 1.

TABLE 1

|  | CM1 | CM2 | CM3 | CM4 |
|---|---|---|---|---|
| Median particle size (μm) | 700 | 715 | 860 | 790 |
| Vd1 (cm³/g) | 0.78 | 0.55 | 0.77 | 0.46 |
| Cohesion (Amount of particles <100 μm (2 bar))* | 0.0% | 0.0% | 0.0% | 0.0% |
| Average pore diameter (nm) | 14.0 | 11.7 | 12.4 | 36.5 |
| BET surface area (m²/g) | 360 | 380 | 360 | 517 |
| Silica content (%) | 70 | 70 | 70 | — |
| Activated carbon content (%) | — | — | — | 75 |
| Cellulose acetate content (%) | 30 | 30 | 30 | 25 |

*measured by the cohesion test mentioned in the description (% by volume)

In particular, it can be seen that the composite materials according to the invention (CM1, CM2, CM3 and CM4), for each of which the amount of particles with a diameter of less than 100 μm, obtained after an air pressure stress of 2 bar (measured by the cohesion test mentioned earlier in the description) is equal to 0.0%, have a higher cohesion than silica alone (for which this amount is 10%) and than activated carbon alone (for which this amount is 2.0%).

Example 5

In order to evaluate their properties for adsorbing volatile and semi-volatile compounds in a stream of cigarette smoke, the composite materials obtained in Examples 1 and 3 were used, after screening between 400 and 800 μm, in cigarette samples made from the tobacco part of standard Coresta Monitor No. 4 samples with which a manually mounted cavity filter is associated.

This filter is made from an 8 mm long cellulose acetate segment, a cavity completely filled (without dead volume) with the additive to be tested and from another 8 mm long cellulose acetate segment. The additive to be tested is made either from one of the composite materials from Examples 1 and 3, or from silica alone or from activated carbon alone (corresponding to those used as the starting material in the above examples) by way of reference; in these last two cases, the quantity of silica or of carbon used in the filter is equal to the quantity of silica present in the filter containing the composite material from Example 1 or 3. The length of the cavity containing the additive is about 9 mm.

After manually mounting the filter, each cigarette sample was conditioned for 90 hours at 60% relative humidity and at a temperature of 22° C., then smoked in a Borgwaldt (RM20H) 20 position rotary smoking machine.

The smoke exiting the filter passes into a "Cambridge" filter that only allows the vapour phase to pass, this then being recovered by cold traps filled with methanol.

The volatile and semi-volatile compounds thus recovered were analysed by gas chromatography-mass spectrometry (GC-MS).

The degrees of reduction of the volatile and semi-volatile species indicated in Table 2 below were determined relative to those obtained with cigarettes of the same type, but for which a 9 mm long cavity was left empty between the two cellulose acetate segments.

TABLE 2

|  | CM1 | CM3 | Silica | Activated carbon |
|---|---|---|---|---|
| Silica content (%) | 70 | 70 | 100 | — |
| Activated carbon content (%) | — | — | — | 100 |
| Quantity used (mg) | 107 | 107 | 75 | 75 |
| | Degree of reduction (%) | | | |
| Pyridine | 81 | 81 | 75 | 55 |
| Crotonaldehyde | 47 | 48 | 34 | 71 |
| Acrolein | 55 | 63 | 52 | 69 |
| Acetone | 72 | 70 | 64 | 68 |
| Methyl ethyl ketone | 84 | 87 | 79 | 71 |
| Acetonitrile | 65 | 63 | 52 | 61 |

It can be seen that the composite materials CM1 and CM3 have very satisfactory adsorption properties. Thus, they make it possible to obtain degrees of reduction of the volatile and semi-volatile species greater than those obtained with silica alone and overall at least equivalent to, even greater than, those obtained with activated carbon alone, while having a better cohesion.

The invention claimed is:

1. A composite material comprised of at least one polymer (P) selected from celluloses, starches, and derivatives thereof and at least one compound (C) selected from mineral oxides, silicoaluminates and activated carbon, wherein the composite material has:
   a median particle size of at least 100 μm;
   a pore volume (Vd1), made up of pores of diameters ranging from 3.6 to 1,000 nm, of at least 0.2 cm³/g; and
   a cohesion such that the amount of particles thereof having a size of less than 100 μm, obtained after an air pressure stress of 2 bar, is less than 1.5% by volume.

2. The composite material as defined by claim 1, wherein said at least one polymer (P) is selected from celluloses and derivatives thereof.

3. The composite material as defined by claim 1, wherein said at least one polymer (P) comprises cellulose acetate.

4. The composite material as defined by claim 1, wherein said at least one compound (C) is selected from silicas, aluminas, zirconium oxides, titanium oxides, iron oxides, cerium oxides, aluminosilicates and activated carbon.

5. The composite material as defined by claim 1, wherein said at least one compound (C) comprises precipitated silica.

6. The composite material as defined by claim 1, wherein said at least one compound (C) comprises activated carbon.

7. The composite material as defined by claim 1, wherein said at least one compound (C) comprises a mixture of precipitated silica and activated carbon.

8. The composite material as defined by claim 1, having a median particle size of at least 200 μm.

9. The composite material as defined by claim 1, having a pore volume (Vd1), made up of pores of diameter ranging from 3.6 to 1,000 nm, of at least 0.3 cm³/g.

10. The composite material as defined by claim 1, having a pore volume (Vd1), made up of pores of diameter ranging from 3.6 to 1,000 nm, of at least 0.5 cm³/g.

11. The composite material as defined by claim 1, having a cohesion such that the amount of particles thereof having a size of less than 100 μm, obtained after an air pressure stress of 2 bar, is less than 1.0%.

12. The composite material as defined by claim 1, having a cohesion such that the amount of particles thereof having a size of less than 20 μm, obtained after an air pressure stress of 2 bar, is equal to 0.0% by volume.

13. The composite material as defined by claim 1, having an average pore diameter, for pores of diameter ranging from 3.6 and 1,000 nm, of greater than 11 nm.

14. The composite material as defined by claim 1, having a BET specific surface area of at least 50 $m^2/g$.

15. The composite material as defined by claim 1, having a median particle size of at least 300 μm, a BET specific surface area greater than 300 $m^2/g$ and a cohesion such that the amount of particles thereof having a size of less than 100 μm, obtained after an air pressure stress of 2 bar, is equal to 0.0% by volume.

16. The composite material as defined by claim 1, having a polymer (P) content of from 10% to 95%, and a compound (C) content of from 5% to 90%.

17. The composite material as defined by claim 1, shaped into cylindrical form or in the form of granules.

18. The composite material as defined by claim 1, further comprising at least one aroma and/or at least one plasticizer.

19. A process for preparing a composite material as defined by claim 1, comprising the following successive steps:
1) adding at least one compound (C), selected from among mineral oxides, aluminosilicates and activated carbon, into a polymer (P) solution, optionally with stirring;
2) forming the mixture obtained, by granulation or by extrusion;
3) introducing, into a liquid that is not a solvent for the polymer (P) and that is at least partially miscible with the solvent comprising the polymer (P) solution, the product formed, in order to render said polymer (P) insoluble;
4) washing the product obtained in order to eliminate, at least partially, the solvent comprising the polymer (P) solution; and
5) drying same.

20. The process as defined by claim 19, said polymer (P) being selected from among the following polymers: a cellulose, a starch, an alginate, a polyethylene, a guar, and a polyvinyl alcohol.

21. The process as defined by claim 19, wherein said polymer (P) comprises cellulose acetate.

22. The process as defined by claim 21, wherein the cellulose acetate solution employed in step 1) contains acetic acid as a solvent.

23. The process as defined by claim 21, wherein the liquid, which is not a solvent for cellulose acetate, employed in step 3) is water or an aqueous solution of acetic acid.

24. The process as defined by claim 19, wherein said at least one compound (C) is selected from among silicas, aluminas, zirconium oxides, titanium oxides, iron oxides, cerium oxides, aluminosilicates and activated carbon.

25. The process as defined by claim 19, wherein said at least one compound (C) comprises precipitated silica.

26. The process as defined by claim 19, wherein said at least one compound (C) comprises activated carbon.

27. The process as defined by claim 19, wherein said at least one compound (C) comprises a mixture of precipitated silica and activated carbon.

28. The process as defined by claim 19, wherein said at least one compound (C) has a BET specific surface area of at least 100 m2/g.

29. The process as defined by claim 19, wherein the step 2) is carried out by granulation, in a granulator equipped with blades or pins.

30. The process as defined by claim 19, wherein the step 2) is carried out by low-pressure or high-pressure extrusion.

31. The composite material as defined by claim 1, shaped as a liquid support.

32. The composite material as defined by claim 1, shaped as a solid support, as an additive or for liquid or gas filtration.

33. A cigarette filter comprising a composite material as defined by claim 1.

34. The cigarette filter as defined by claim 33, comprising precipitated silica and activated carbon.

* * * * *